(12) United States Patent
Tytgat et al.

(10) Patent No.: US 12,406,429 B2
(45) Date of Patent: Sep. 2, 2025

(54) OCCLUSION DETECTION

(71) Applicant: NOKIA TECHNOLOGIES OY, Espoo (FI)

(72) Inventors: Donny Tytgat, Oosterzele (BE); Jean-Francois Macq, Ganshoren (BE); Christoph Stevens, Stekene (BE)

(73) Assignee: NOKIA TECHNOLOGIES OY, Espoo (FI)

( * ) Notice: Subject to any disclaimer, the term of this patent is extended or adjusted under 35 U.S.C. 154(b) by 304 days.

(21) Appl. No.: 18/069,390

(22) Filed: Dec. 21, 2022

(65) Prior Publication Data

US 2023/0196655 A1    Jun. 22, 2023

(30) Foreign Application Priority Data

Dec. 21, 2021    (EP) .................................. 21216280.4

(51) Int. Cl.
| | |
|---|---|
| *G06T 15/06* | (2011.01) |
| *G06T 15/20* | (2011.01) |
| *G06T 17/00* | (2006.01) |
| *G06T 19/00* | (2011.01) |

(52) U.S. Cl.
CPC .............. *G06T 15/06* (2013.01); *G06T 15/20* (2013.01); *G06T 17/00* (2013.01); *G06T 19/006* (2013.01)

(58) Field of Classification Search
CPC ......... G06T 15/06; G06T 15/20; G06T 17/00; G06T 19/006
See application file for complete search history.

(56) References Cited

U.S. PATENT DOCUMENTS

2012/0105450 A1\* 5/2012 Sourimant .............. G06T 15/50
345/421
2019/0212746 A1    7/2019 Cheng et al.
2019/0371072 A1   12/2019 Lindberg et al.
(Continued)

FOREIGN PATENT DOCUMENTS

EP    3 258 445 A1    12/2017

OTHER PUBLICATIONS

Extended European Search Report for European Application No. 21216280.4 dated Aug. 8, 2022, 11 pages.
(Continued)

*Primary Examiner* — Michelle Chin
(74) *Attorney, Agent, or Firm* — ALSTON & BIRD LLP

(57) ABSTRACT

An apparatus and method provide for occlusion detection. An example apparatus includes means for: receiving first data comprising a reference viewpoint of a real-world space; receiving second data comprising a position of a target object in the real-world space; transforming, based on the first and second data, at least one of the reference viewpoint and the target object position into a common virtual reference space; generating one or more rays which extend between the reference viewpoint and a respective spatial point associated with the position of the target object in the common virtual reference space; and determining the digital model representing the real-world space and including one or more real-world features, an occlusion status between the reference viewpoint and the target object. The occlusion status is based on an intersection of the one or more real-world features and the one or more generated rays.

18 Claims, 11 Drawing Sheets

(56) References Cited

U.S. PATENT DOCUMENTS

2020/0126415 A1    4/2020   Lin et al.
2021/0073430 A1    3/2021   Levy et al.
2021/0233305 A1*   7/2021   Garcia ...................... G06T 5/77

OTHER PUBLICATIONS

Hou et al., "Literature Review of Digital Twins Applications in Construction Workforce Safety", Journal of Applied Sciences, 11(1), (Dec. 31, 2020), 21 pages.

Kikuchi et al., "Landscape Visualization by Integrating Augmented Reality and Drones with Occlusion Handling to Link Real and Virtual Worlds—Towards City Digital Twin Realization", Proceedings of the 39th eCADDe Conference, vol. 2, (Sep. 8-10, 2021), 8 pages.

Méndez-Feliu et al., "From Obscurances to Ambient Occlusion: A Survey", The Visual Computer 25, (Feb. 15, 2008), 16 pages.

Tian et al., "Occlusion Handling Using Moving Volume and Ray Casting Techniques for Augmented Reality Systems", Multimedia Tools and Applications, 77, (Sep. 30, 2017), 18 pages.

* cited by examiner

OCCLUSION DETECTION

CROSS-REFERENCE TO RELATED APPLICATIONS

This application claims priority to European Patent Application No. 21216280.4, filed Dec. 21, 2021, the entire contents of which are incorporated herein by reference.

FIELD

Example embodiments may relate to systems, methods and/or computer programs for occlusion detection.

BACKGROUND

In traditional user-facing computational systems, defined mechanisms govern how the systems should behave and how they should be interacted with by a user. A mobile phone for instance has several abstract interface and interaction mechanisms that are expected to be learned by the end user in order to use the device.

"Spatial computing" on the other hand uses the real world and the surroundings of the user as the context for the interface between the user and the system, and adapts the interaction mechanisms based on these surroundings. The term "spatial computing" can be used in the context of augmented, virtual and mixed reality to refer to the use of a user's physical actions (body movement, gesture and/or speech) as inputs to a computational system, where the system outputs (audio, visual and/or haptic) are applied to the user's surroundings (i.e. the real, 3D world). Initial implementations of spatial computing include augmented/mixed reality applications on a mobile phone, where one can, for example, place virtual furniture in the house to see how it looks before purchasing the item. Such phone based mixed reality applications/experiences are just one use case.

Spatial computing relies on spatial awareness; in order for a system to adapt to the surroundings of the user, the system needs to have knowledge of these surroundings and be able to interpret them. Spatial computing is therefore often tied to the concept of a "digital twin", a virtual representation of a physical object (or environment) that serves as a real-time digital counterpart of the real world physical object (or environment). In other words, a digital twin of a real-world space is a computational model that stores—at a certain level of abstraction—the important features of the space. The digital representation of these features can then be used for computational processing of spatially aware algorithms.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus comprising means for: receiving first data comprising a reference viewpoint of a real-world space; receiving second data comprising a position of a target object in the real-world space; transforming, based on the first and second data, at least one of the reference viewpoint and the target object position into a common virtual reference space; generating one or more rays which extend between the reference viewpoint and a respective one of one or more spatial points associated with the position of the target object in the common virtual reference space; and determining, using the generated one or more rays and a digital model, the digital model representing the real-world space and including one or more real-world features thereof, an occlusion status between the reference viewpoint and the target object, wherein the occlusion status is based on an intersection of the one or more real-world features and the one or more generated rays.

Hidden objects could for example pose a security risk (e.g. a moving object that is coming from around the corner) and knowledge of these objects could therefore improve safety. Other examples where knowledge of hidden objections can be helpful relate to mixed or augmented reality applications, where object overlays change depending on the occlusion nature of the object (overlays might need to be hidden for instance when the object is not in view). By determining an occlusion status in accordance with the first aspect, these knowledge such hidden objects may be provided in an effective and efficient manner.

Optionally, the one or more real-world features of the digital model comprise static features of the real-world space. Optionally, the common virtual reference space corresponds to, or maps to, the reference space of the digital model. Alternatively, the apparatus further comprises means for transforming the reference space of the digital model into the common virtual reference space.

Optionally, the second data further comprises a three-dimensional volume associated with the target object, the apparatus further comprising means for spatially sampling a plurality of points of the three-dimensional volume to determine the one or more spatial points associated with the position of the target object, the generating means being configured to generate a plurality of rays extending between the reference viewpoint and each of the plurality of sampled points of the volume, wherein the occlusion status is based on a number of the plurality of rays intersected by the one or more real-world features.

Optionally, the apparatus further comprises means for receiving a weight map comprising a plurality of weights, each of the plurality of weights associated with a respective portion of the three-dimensional volume, wherein, for each respective portion of the three-dimensional volume, the sampling means is configured to sample a respective portion of the plurality of points.

Optionally, the sampling means is configured to sample the respective portion of the plurality of points using a sampling rate which is reflective of the weight associated with the respective portion of the three-dimensional volume.

Optionally, the apparatus further comprises means for generating a two-dimensional projection of the weight map based on a two-dimensional projection of the three-dimensional volume from the reference viewpoint, wherein the sampling means is configured to sample the respective portion of the plurality of points using a sampling rate determined based on the two-dimensional projection of the weight map.

Optionally, the second data is received from one or more sensors, wherein one or more of the plurality of weights of the weight map are indicative of a margin of error of the one or more sensors.

Optionally, the sampling means is configured to spatially sample the plurality of points of the three-dimensional volume at a uniform sampling rate. Optionally, the sampling means is configured to spatially sample the plurality of points of the three-dimensional volume at a sampling rate determined based on a two-dimensional projection of the three-dimensional volume from the reference viewpoint. Optionally, the sampling means is configured to randomly sample the plurality of points, optionally configured to randomly sample the plurality of points using a Monte Carlo method. One or more of these sampling rates may be used in combination, depending on the given application.

Optionally, the apparatus further comprises means for generating an occlusion vector by transforming each of the one or more generated rays into a reference space of the reference viewpoint, the occlusion vector comprising, for each of the one or more generated rays and the respective spatial point associated with the position of the target object, a transformation of the respective spatial point into the reference space of the reference viewpoint and an indication of whether the ray is occluded. Optionally, the apparatus further comprises means for outputting the occlusion vector.

Optionally, the reference viewpoint is determined based on a camera model. Optionally, the reference viewpoint is determined based on a pinhole camera model, wherein the reference viewpoint comprises a single spatial point in the common virtual reference space. Optionally, wherein the reference viewpoint comprises a viewpoint of a user in the real-world space.

According to a second aspect, there is described a method comprising: receiving first data comprising a reference viewpoint of a real-world space; receiving second data comprising a position of a target object in the real-world space; transforming, based on the first and second data, at least one of the reference viewpoint and the target object position into a common virtual reference space; generating one or more rays which extend between the reference viewpoint and a respective one of one or more spatial points associated with the position of the target object in the common virtual reference space; and determining, using the generated one or more rays and a digital model, the digital model representing the real-world space and including one or more real-world features thereof, an occlusion status between the reference viewpoint and the target object, wherein the occlusion status is based on an intersection of the one or more real-world features and the one or more generated rays.

Example embodiments of the apparatus may also provide any feature of the method of the second aspect.

According to a third aspect, this specification describes a computer program comprising instructions for causing an apparatus to perform at least the following: receiving first data comprising a reference viewpoint of a real-world space; receiving second data comprising a position of a target object in the real-world space; transforming, based on the first and second data, at least one of the reference viewpoint and the target object position into a common virtual reference space; generating one or more rays which extend between the reference viewpoint and a respective one of one or more spatial points associated with the position of the target object in the common virtual reference space; and determining, using the generated one or more rays and a digital model, the digital model representing the real-world space and including one or more real-world features thereof, an occlusion status between the reference viewpoint and the target object, wherein the occlusion status is based on an intersection of the one or more real-world features and the one or more generated rays.

Example embodiments of the third aspect may also provide any feature of the second aspect.

According to a fourth aspect, this specification describes a computer-readable medium (such as a non-transitory computer-readable medium) comprising program instructions stored thereon for performing at least the following: receiving first data comprising a reference viewpoint of a real-world space; receiving second data comprising a position of a target object in the real-world space; transforming, based on the first and second data, at least one of the reference viewpoint and the target object position into a common virtual reference space; generating one or more rays which extend between the reference viewpoint and a respective one of one or more spatial points associated with the position of the target object in the common virtual reference space; and determining, using the generated one or more rays and a digital model, the digital model representing the real-world space and including one or more real-world features thereof, an occlusion status between the reference viewpoint and the target object, wherein the occlusion status is based on an intersection of the one or more real-world features and the one or more generated rays.

According to a fifth aspect, this specification describes an apparatus comprising: at least one processor; and at least one memory including computer program code which, when executed by the at least one processor, causes the apparatus to: receive first data comprising a reference viewpoint of a real-world space; receive second data comprising a position of a target object in the real-world space; transform, based on the first and second data, at least one of the reference viewpoint and the target object position into a common virtual reference space; generate one or more rays which extend between the reference viewpoint and a respective one of one or more spatial points associated with the position of the target object in the common virtual reference space; and determine, using the generated one or more rays and a digital model, the digital model representing the real-world space and including one or more real-world features thereof, an occlusion status between the reference viewpoint and the target object, wherein the occlusion status is based on an intersection of the one or more real-world features and the one or more generated rays.

BRIEF DESCRIPTION OF THE DRAWINGS

Example embodiments will now be described by way of non-limiting example, with reference to the accompanying drawings, in which.

DETAILED DESCRIPTION

Knowing that there are objects of interest which are hidden from view—hereafter called occlusions or occluded objects—can be very important. Hidden objects could for example pose a security risk (e.g. a moving object that is coming from around the corner) and knowledge of these objects could therefore improve safety. Other examples where occlusions can be helpful relate to mixed or augmented reality applications, where object overlays change depending on the occlusion nature of the object (overlays might need to be hidden for instance when the object is not in view). Knowledge of occlusions can offer the user an extended form of spatial awareness that goes beyond what is physically possible in the non-augmented real world.

Figure 1:
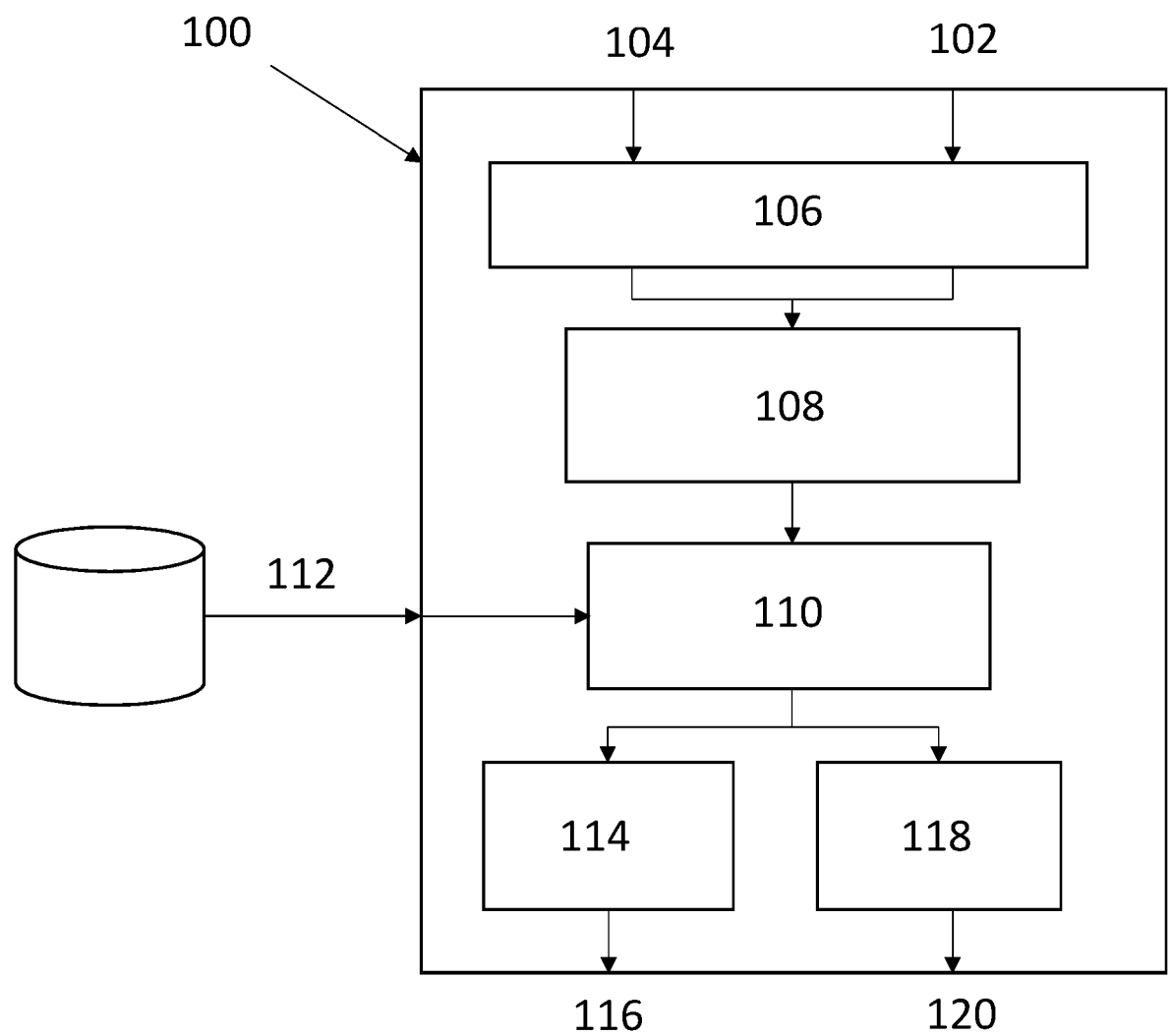
FIG. 1 is a plan view of an example apparatus for performing occlusion detection.

With reference to FIG. 1, an example apparatus too is shown for determining an occlusion status of a target object in a real-world space or environment. In particular, the apparatus is configured for detecting occlusions of (potentially moving) target objects with respect to a reference viewpoint (which can be fixed or moving). The reference viewpoint and target object information can be used, in combination with a digital model of the real-world space, to infer whether there is an occlusion and to identify the location of the occlusion in the reference space of the reference viewpoint. In this way, real-time occlusion detection of real-world objects can be performed in a complex scene. The occlusion information can then be used for further analysis, actuation of one or more devices and/or presentation to a user.

The apparatus 100 comprises means for receiving (not shown) first data 102 comprising a reference viewpoint of the real-world space and means for receiving (not shown) second data 104 comprising a position of a target object in the real-world space. The first and second data can be received using any suitable communication protocol, over any suitable network arrangement. For example, embodiments may be deployed in 2G/3G/4G/5G networks and further generations of 3GPP, but also in non-3GPP radio networks such as WiFi. Embodiments may also use Bluetooth, for example. Names of network elements, protocols, and methods are based on current standards. In other versions or other technologies, the names of these network elements and/or protocols and/or methods may be different, as long as they provide a corresponding functionality.

The reference viewpoint can optionally be a viewpoint of a user in the real-world space, or the reference viewpoint can be any other viewpoint in the real-world space (for example a viewpoint of a camera device, or a viewpoint of a robotic device). The reference viewpoint of the first data 102 is defined with respect to a reference space for which it is desired to evaluate any occlusion of the target object (the reference space of the user or robot, for example). The evaluation is done using a digital model 112, the digital model representing the real-world space and including one or more real-world features thereof. A digital model of a real-world space (also known as a digital twin) is a computational model that stores—at a certain level of abstraction—information describing one or more real features of the real-world space. This model can then be used for computational processing of spatially aware algorithms. Digital models, or digital twins, can allow the integration of many different information sources into a consistent representation of a space, and can then be used in applications that require spatial relevance (such as spatial computing for augmented/mixed reality applications).

The apparatus 100 further comprises means for transforming 106, based on the first and second data, at least one of the reference viewpoint and the target object position into a common virtual reference space. A common reference space is required in order that subsequent analysis of the data is with respect to a single reference space. The choice for this common reference space is application dependent. In one example, a reference space of the digital model 112 can be used as the common virtual reference space and both the first viewpoint data 102 and the second target object data 104 can be transformed into this digital model reference space. In other words, the common virtual reference space corresponds to, or maps to, the reference space of the digital model 112. This approach can be less computationally intensive than transforming the digital model 112 into another reference space. However, in other examples, the reference space of the digital model 112 may be transformed into one of the other reference spaces of the first data 102 and second data 104 inputs. For example, the second target object data 104 and the digital model 112 may be transformed into a reference space of the first viewpoint data 102. This implementation may have advantages when an occlusion vector is to be generated, as discussed further below. In other examples, a fourth reference space can be used as the common reference space into which all inputs 102, 104, 112 need to be transformed. Any and all of these transformations can be performed by the means for transforming 106, or by one or more additional transforming means not shown in FIG. 1.

The apparatus 100 further comprises means for generating 108 one or more rays which extend between the reference (optionally user) viewpoint and one or more spatial points associated with the position of the target object in the common virtual reference space. Where the target object is represented as a point object, it will be understood that a single spatial point corresponding to the position of the point object in the common reference space will be used. In other examples, the target object may be represented as a two-dimensional or three-dimensional object, with a plurality of spatial points representing the position of the target object. Each ray extends to a respective one of the one or more spatial points, such that each spatial point of the target object is associated with a different ray.

The one or more generated rays are also referred to herein as sampling rays. The sampling ray(s) start from the reference viewpoint and extend to the target object and can be used to determine whether there are occlusions between the viewpoint and the object. Each ray originates at the reference viewpoint (or at a respective spatial point associated with the reference viewpoint) and passes through a respective spatial point associated with the target object. The rays are generated in the common virtual reference space. Any suitable ray tracing techniques can be used to generate the one or more rays between the viewpoint and the spatial point(s) of the target object. Particular examples of generating the one or more rays will be discussed below in more detail with respect to FIG. 2.

The apparatus comprises means for determining 114, using the generated one or more rays and the digital model 112, an occlusion status 116 between the reference viewpoint and the target object. As mentioned above, the digital model 112 represents the real-world space and includes one or more real-world features of the space. These features can be static features of the real-world space or environment, such as walls, doors or other stationary objects. However, in some examples the features can be one or more moving objects (such as people or robots/machinery) and the digital model 112 may be updated in substantially real time with a position of said moving objects. In such examples, occlusions caused by said real-world features may be similarly determined in substantially real-time to allow for tracking of moving objects around the space/environment; for example, real-time ray tracing may be used to generate the one or more rays.

The occlusion status 116 is determined based on an intersection of the one or more real-world features and the one or more generated rays. The intersection can be determined by means for determining intersections 110 shown in FIG. 1, or by any other suitable means. In some examples, determining the occlusion status and determining the intersection can both be performed by the means for determining 114. In other words, the functionality of means 110 and means 114 may be combined in a single component. It will be further understood that the different means of apparatus 100 described herein can be provided in any suitable combination, and the functionalities of one or more means may be combined.

A particular implementation for determining an intersection between a generated ray and a representation of a real-world feature in the digital model 112 is now discussed. In this implementation, a definition for the set of sampling rays R is provided by Equation 1 below. Note that $X_{vp}$ is the set of spatial points for the viewpoint and $X_{obj}$ is the set of spatial points for the target object, where $x_{vp} \in X_{vp}$ and $x_{obj} \in X_{obj}$. Each ray $r \in R$ extends from a respective spatial point $x_{vp}$ and passes through a respective spatial point $x_{obj}$.

$$R = \{x_{vp} + t(x_{obj} - x_{vp}) | x_{vp} \in X_{vp}, x_{obj} \in X_{obj}\} \quad \text{Equation 1}$$

The determination of intersections between the sampling rays and the digital model comprises determining, for each of the rays $r \in R$, whether there is an occlusion along that ray. This can be done by intersecting the sampling rays with each of the real-world features represented within the digital model (also termed digital model solids) and solving for t in the equation of ray r. For example, respective spatial positions (coordinates) of a boundary of a digital solid in the digital model 112 could be set equal to the equation of ray r and the equation solved for each respective boundary position. Alternatively, the intersection can be resolved using a (set of) geometric shapes that, together, result in the boundary of the solid. For triangle meshes for instance, a boundary is made up out of triangles and one needs to calculate the intersection between each of the sampling rays with the triangles of the boundary. This can be done in closed form (i.e. with a single formula, without sampling). These are examples of boundary-based approaches to determining an intersection. In volume-based approaches, 3D shapes can be used as the basis for the intersection (e.g. determine whether a ray passes through a sphere). Again, closed-form solutions typically exist. Examples of suitable techniques are known in the domain of ray tracing/ray casting.

An intersection is detected if $t \in [0,1]$. A value of t<0 or a value of t>1 indicates that the digital solid is positioned along the line that the ray lies on but is not positioned between the viewpoint and the target object. For example, if t<0 the viewpoint may be between the digital model solid and the target object, and if t>1 the target object may be between the digital model solid and the viewpoint. A value of t=0.5, for example, indicates that the digital solid is positioned between the viewpoint and the target object points $x_{vp}$, $x_{obj}$, half way along the ray r which extends between those two points.

As described herein, a digital model solid is defined as a part of the digital model that blocks the visible frequencies of light (mirroring the occluding effect of the real-life features). However, depending on the particular application scenario, the digital model solid could be used to extend the notion of occlusion beyond the typical occlusion of visible light to any electromagnetic radiation; for example, a digital model solid could be defined to detect whether certain frequencies of radio waves are blocked by features in the real-world space.

The occlusion status 116 can be based on a number of the one or more generated rays which are determined to intersect with the real-world feature(s). For example, the occlusion status can comprise an occlusion percentage which represents the ratio of occluded rays with respect to the total number of generated rays. In some examples, the reference viewpoint is associated with a single spatial point (i.e. a pinhole camera model is used to represent the reference viewpoint), and the position of the target object is represented as a point object and associated with a single spatial point. In such situations, there will only be one sampling ray generated. $X_{vp}$ is a set of one spatial point in the case of the pinhole camera model, and) $X_{obj}$ is a set of one spatial point in the case of a single point target object. Where only one ray is generated, the occlusion status is represented by a ratio of 0 or 1 (i.e. the ray is either occluded or is not occluded). In other examples, discussed with reference to FIG. 2, more than one ray is generated.

Optionally, the apparatus further comprises means for generating 118 an occlusion vector 120. In some examples, vector 120 may only be generated if it is determined from the occlusion status 116 that the target object is at least partially occluded. Generating an occlusion vector 120 comprises transforming each of the one or more generated rays into a reference space of the reference viewpoint. In such implementations, when the common reference space is the reference space of the viewpoint (i.e. when the input first data 102 is not transformed), no transformation is needed. In some implementations, transformation of the generated rays can comprise back-projection of the rays towards the reference space associated with the viewpoint. An occlusion vector 120 can be created that holds, for each of the rays, information regarding the respective spatial point in the reference space of the reference viewpoint (the "transformed point") and an indication of whether the ray is occluded. The indication can be a binary value that reflects whether that particular ray was occluded or not, or any other suitable indication.

Although the viewpoint itself is defined in 3D space, if the reference space associated with the viewpoint may be 2D. For example, if the reference viewpoint is a camera image, the occlusion vector contains the occlusion status for the points that are represented in the coordinate space of the camera images; if a 2D camera is used the points should be transformed into 2D space (e.g. using an appropriate camera matrix). The "transformed point" can be determined in any suitable manner, but the calculation of the "transformed point" is implementation dependent because it depends on the camera/viewpoint model used. For example, if the reference viewpoint is modelled as a pinhole camera and the target object is modelled as a single point, there is only 1 ray for which an occlusion result is obtained; in order to get to the "transformed point", one needs to intersect the ray with the image plane of the pinhole camera model. For more advanced camera models, other approaches need to be employed, as would be understood by one skilled in the art.

Optionally, the apparatus comprises means for outputting the occlusion status 116. Optionally, the apparatus comprises means for outputting the occlusion vector 120. The occlusion status and/or occlusion vector may then be used to construct a representation of the target object for presentation to a user. In some examples, the apparatus is part of a system comprising means for providing a representation of the target object and/or the occlusion status 116 for output. The representation of the target object may be reflective of the occlusion status and/or occlusion vector (for example, occluded portions of the target object may be hidden from the reference viewpoint, or virtual representations of the occluded portions may be rendered and provided to a user). In some examples, the output occluded status and/or occlusion vector may be used to actuate or otherwise control a robotic device (for example to adjust a path or course of the robotic device, or to adjust a speed of the robotic device), or to issue an alert (audio and/or visual and/or haptic) to a user.

Figure 2:
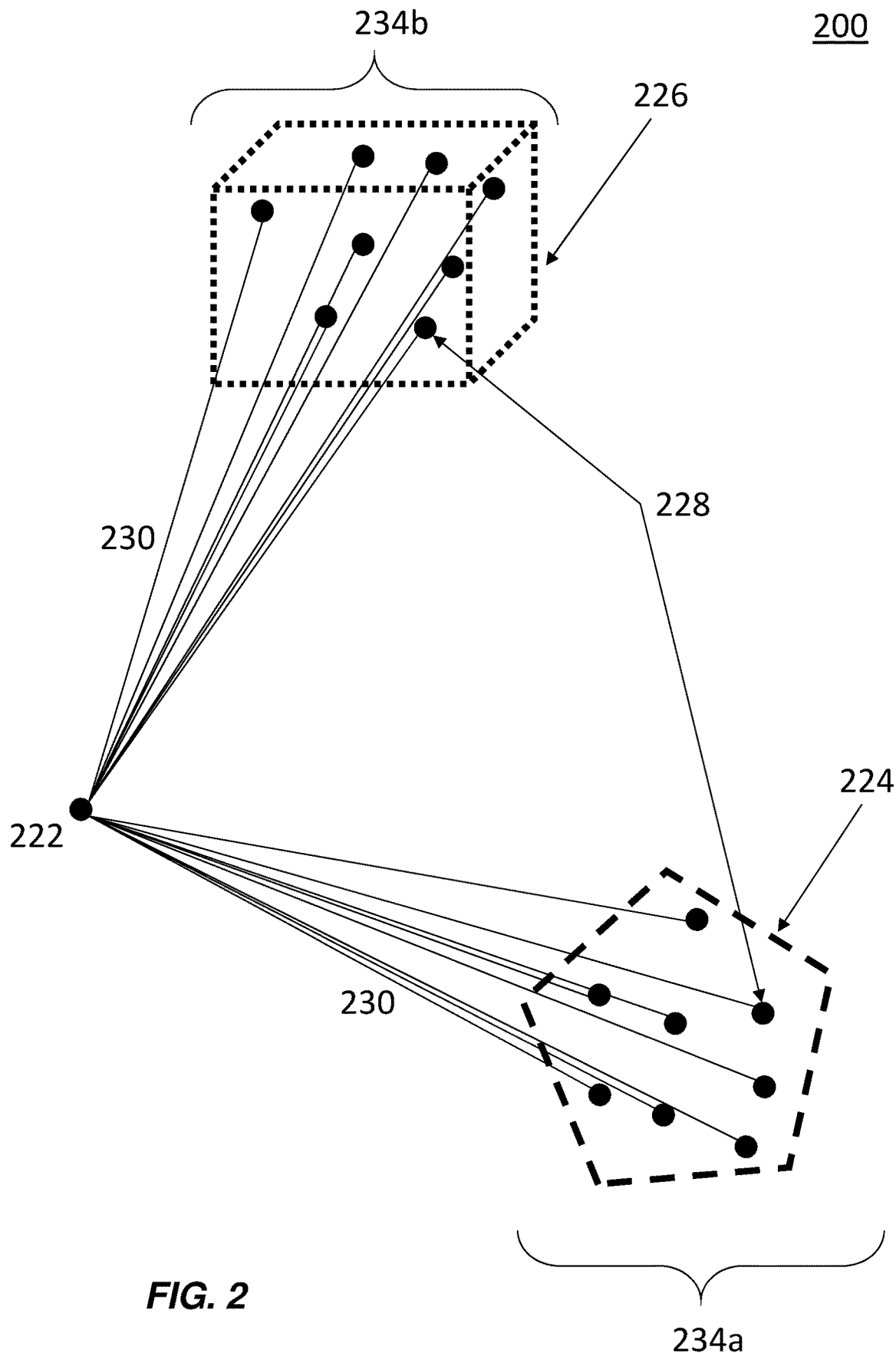
FIG. 2 is a schematic representation of a target object and viewpoint transformed into a common virtual reference space.

Generation of the one or more rays will now be discussed further with reference to FIG. 2, which is an example representation of the viewpoint and target object in the common virtual reference space 200 into which the inputs of the first data 102 and/or the second data 104, and/or digital model 112, have been transformed by the transforming means 106 of apparatus 100. FIG. 2 shows a reference viewpoint 222 and a target object 234a having an associated two-dimensional shape 224 (represented by the dashed lines). In another example also shown in FIG. 2, a target object 234b has an associated three-dimensional volume 226 (represented by the dotted lines). The second data 104 received by the apparatus further comprises either the two-dimensional size or three-dimensional volume associated with the target object 234 (234a, 234b) in some examples. In other examples, the two-dimensional size or three-dimensional volume associated with the target object 234 (234a, 234b) are received by the apparatus independent of the second data 104.

Although single point target objects are envisaged herein, it is recognised that a binary occlusion ratio of 0 or 1 can be error prone, as target object position inputs (i.e. second data 104 comprising a position of a target object in the real-world space) to apparatus 100 can be the result of an analysis process and contain noise or error. This noise/error can lead to instability in the occlusion results along the boundary of an occluding digital twin solid. It can therefore be advantageous to use the virtual shapes or volumes discussed with reference to FIG. 2. Virtual shapes or volumes around the target object can facilitate determination of a continuous occlusion ratio along the boundary of a feature, as well as allowing to assess the proximity of the target object to an occluding feature boundary. This can improve the stability of the occlusion status 116, and so improve performance.

The following discussion will focus on a three-dimensional volume, but the description is equally applicable to a two-dimensional size of the target object, and in some examples a two-dimensional target object shape is used instead of a three-dimensional volume. The volumetric representation 226 does not necessarily need to map directly with the actual object volume. Rather, volume 226 can be considered as an abstract volume for deriving an occlusion status 116. Volume 226 could be a simplified volume (e.g. a bounding box of a target object rather than the full object volume), a thickened version of the actual volume (e.g. in case of a very flat, 2d-like object), or any other suitable volume for a given applications.

In some examples, the volume 226 may comprise an effective volume of the target object 234 and an additional virtual volume around the effective volume. The effective volume can be used to determine occlusion, and the virtual volume can be used to assess proximity of the target object from an occluding feature; the volumetric information received at the apparatus 100 can indicate the different portions of the volume and allow the results to be separated out by the different volume portions. A virtual volume can also be of use in applications where a warning/alert is to be provided when a target object will be occluded, or where rendering characteristics are adjusted as a real-world target object is becoming occluded (e.g. virtual information can be faded out when the target object is about to be occluded).

Optionally, apparatus 100 of FIG. 1 further comprises means for spatially sampling a plurality of points of (i.e. within) the three-dimensional volume to determine the one or more spatial points associated with the position of the target object. These sampled points 228 are represented by the black dots within the volume 226 and shape 224 in FIG. 2. The generating means 108 of the apparatus 100 can thus be further configured to generate a plurality of rays 230 extending between the reference viewpoint and each of the plurality of sampled points 228. If the target object is defined by a single point object, only one sample point 228 is needed (the single point itself, as discussed above). If the object has a shape or volume associated with it, multiple points 228 on the target object need to be sampled.

For constructing the viewpoint 222, a pinhole camera model can be assumed. In this pinhole camera example, the viewpoint 222 is represented by a single point, as shown, and there is only one spatial point associated with the viewpoint 222. However, more complex camera models can be used. In such cases, a non-point view point can be modelled or approximated and sampled in the same way as the target object is, with any suitable sampling rate. For example, where the reference viewpoint is the viewpoint of a user within the real-world environment, a single point can be used which is representative of a user's eyes. Where the reference view point is that of a camera/detector within the environment, the physical camera sensor area can be modelled and sampled to determine the spatial points. An example of this can be seen in FIG. 3, where the viewpoint 222 is associated with a plurality of spatial points 232 and the target object 234 is also associated with a plurality of spatial points 228.

Figure 3:
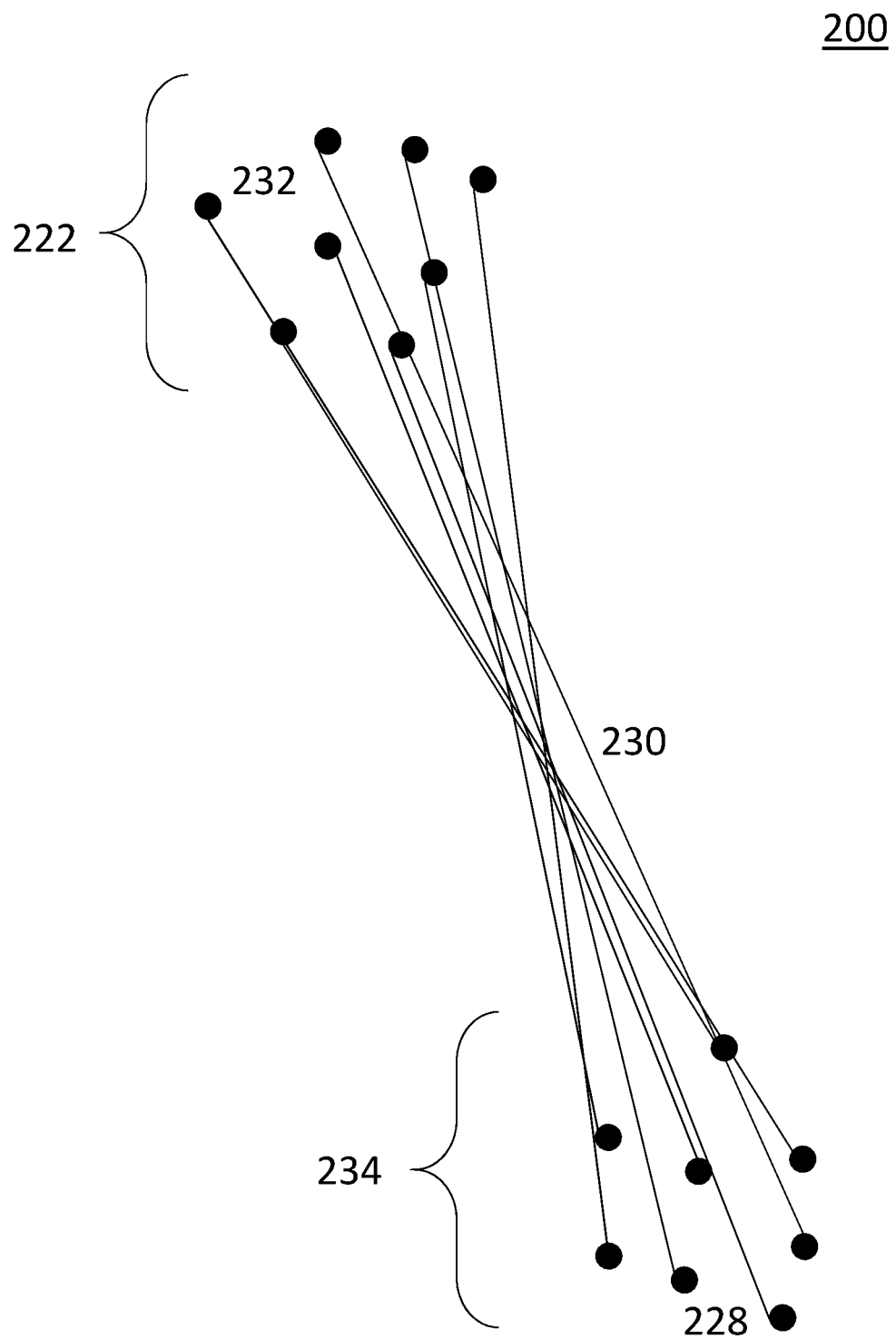
FIG. 3 is another schematic representation of a target object and viewpoint transformed into a common virtual reference space.

In both FIG. 2 and FIG. 3, rays 230 extend between the sample point(s) of the reference viewpoint and each of the plurality of sampled points on the target object. Where the reference viewpoint also comprises a plurality of sampled points, rays 230 can be understood to extend between a respective pair of sampled points 232, 228. In either arrangement, each spatial point 228 of the target object is associated with one ray 230 which passes through said spatial point 228. As discussed above, the occlusion status 116 is based on a number of the plurality of rays 230 intersected by the one or more real-world features (not shown), and can be expressed as a ratio or percentage of the total number of generated rays 230.

The sampling means can be configured to operate in any suitable manner. In one example, the target object 234 (and optionally the viewpoint 222) can be randomly sampled and rays 230 constructed using these sampled points, each ray originating at a viewpoint sample point and passing through a target object sample point. In other words, the sampling means is configured to randomly sample the plurality of points. Optionally, the sampling means is configured to randomly sample the plurality of points using a Monte Carlo method.

In another example, the sampling means is configured to spatially sample the plurality of points of the three-dimensional volume 226 of the target object 234 at a uniform sampling rate, where the term "rate" as used herein is understood to refer to a ratio of sample points per unit of space, not per unit of time. In other words, a sampling rate which is spatially uniform in three-dimensions may be used. However, the number of rays which are occluded with respect to the total number of rays is typically interpreted in two-dimensions, from the point-of-view of the reference viewpoint (for example, from a user's point of view). If sampling is performed in three-dimensions, a uniform sampling rate in three-dimensions may not provide a uniform (or quasi-uniform) sampling rate in two-dimensions, since the uniformity of the projected samples depends on the volumetric shape 226 and the reference viewpoint. For example, assume the volume 226 is a three-dimensional pyramid: when said pyramid is viewed from the bottom/base or top as a two-dimensional projection the outer area of the projected pyramid will be more sparsely sampled compared to the inner area, but when said pyramid is viewed from the side the top area will be more sparsely sampled compared to the bottom area.

If a uniform two-dimensional sampling rate is required for a given application, the three-dimensional sampling rate can be adjusted to account for this projection artefact. In another example, the sampling means can be configured to spatially sample the plurality of points of the three-dimensional volume 226 at a sampling rate determined based on a two-dimensional projection of the volume 226 of the target object from the reference viewpoint 222. Another possible implementation is to over sample the volume 226 in three-dimensions until a minimum sampling rate is obtained across the two-dimensional, projected, surface; samples from the oversampled areas of this projected surface can then be filtered out/removed until a uniform two-dimensional sampling rate is achieved. In this way, the sampling means can be configured to sample the plurality of spatial points with a sampling rate which is uniform or substantially uniform in two dimensions.

Optionally, the apparatus too of FIG. 1 further comprises means for receiving a weight map. The weight map may be received as part of the second data 104, or may be received independently of the second data 104. Optionally, the three-dimensional volume 226 (or the volumetric representation) and weight map are received together, and may be combined. A weight map can be used to give more focus towards parts of the volume 226 that have more weight/importance, or for which the position of the target object is more certain. A centre of a target object may be sampled at a higher rate than the edges, or a bottom of a target object may be sampled at a higher rate than the top, for example. In some implementations, the weight map can be used to account for non-uniform reliability of the volume. For example, the second data 104 can be received from one or more sensors, wherein the plurality of weights of the weight map are indicative of a margin of error of the one or more sensors. In another example, a detector or analyser that provides the volume 226 may have a certain margin of error, and this can be translated into a larger volume with declining weights towards the edges of the volume. The weights may also be used to help distinguish between an effective volume and additional virtual volume, as discussed above.

The weight map comprises a plurality of weights, each of the plurality of weights associated with a respective portion of the three-dimensional volume 226. For each respective portion of the three-dimensional volume, the sampling means is configured to sample a respective portion of the plurality of points at an associated sampling rate. For example, the sampling means is configured to sample the respective portion of the plurality of points using a sampling rate which is reflective of the weight associated with the respective portion of the three-dimensional volume. In other words, different portions of the volume 226 are sampled at different sampling rates to obtain the plurality of sampled points. The weight map reflects the target sampling rate for the related portion of the volume 226.

Optionally, the apparatus 100 of FIG. 1 further comprises means for generating a two-dimensional projection of the weight map based on a two-dimensional projection of the volume 226 (i.e. projection of the volume associated with the target object) from the reference viewpoint. In view of the differences between two-dimensional and three-dimensional sampling rates discussed above, in some implementations the sampling rate can be selected or determined based on the projected weight map. In other words, the sampling means can be configured to sample the respective portion of the plurality of points using a sampling rate determined based on the two-dimensional projection of the weight map. It will be understood that projecting the three-dimensional weight map into two-dimensions can result in multiple, different, weights for a given two-dimensional area. Therefore, in some examples a maximum weight for a given two-dimensional area can be chosen as the weight. Alternatively, in some examples the average weight or the median weight in the two-dimensional area can be chosen as the weight. Other approaches are also possible, and different approaches may be used for different areas of the two-dimensional projection. The sampling rate can be determined based on the chosen weight for each projected area.

Particular example implementations of the above-discussed occlusion detection are now discussed in further detail.

Implementation 1: X-Ray Vision for Mixed Reality

One example implementation of the occlusion detection and occlusion status 116 described herein is to improve the environmental awareness of mixed-reality systems by enabling see-through capabilities ("x-ray vision"), in order that a user may see through an occluding real-world feature to a target object beyond. This can be facilitated through the use of external sensors, by analysing their data streams and building a transformed representation that is used to determine an occlusion status and therefore to enable a see-through experience for a user.

The available sensors within the environment are first used to identify "relevant", but hidden target objects for the user of the mixed reality system. The target objects may be completely hidden to the user, or may be partially hidden (i.e. part of the target object is out of line of sight of the user). The notion of relevancy can be application/domain dependent, and may be attributed to goals such as safety (i.e. see objects that are approaching from around the corner) or productivity (i.e. see parts of the machinery that are hidden to the eye but are relevant for the job at hand). After identifying the relevant objects from the sensors, the object-specific information is extracted from the sensor data and this data is used to build the occlusion status 116 and/or occlusion vector 120; the occlusion information can then be used to construct a representation of the target object for presentation of said target object to the user, e.g. from the viewpoint of said user.

Figure 4:
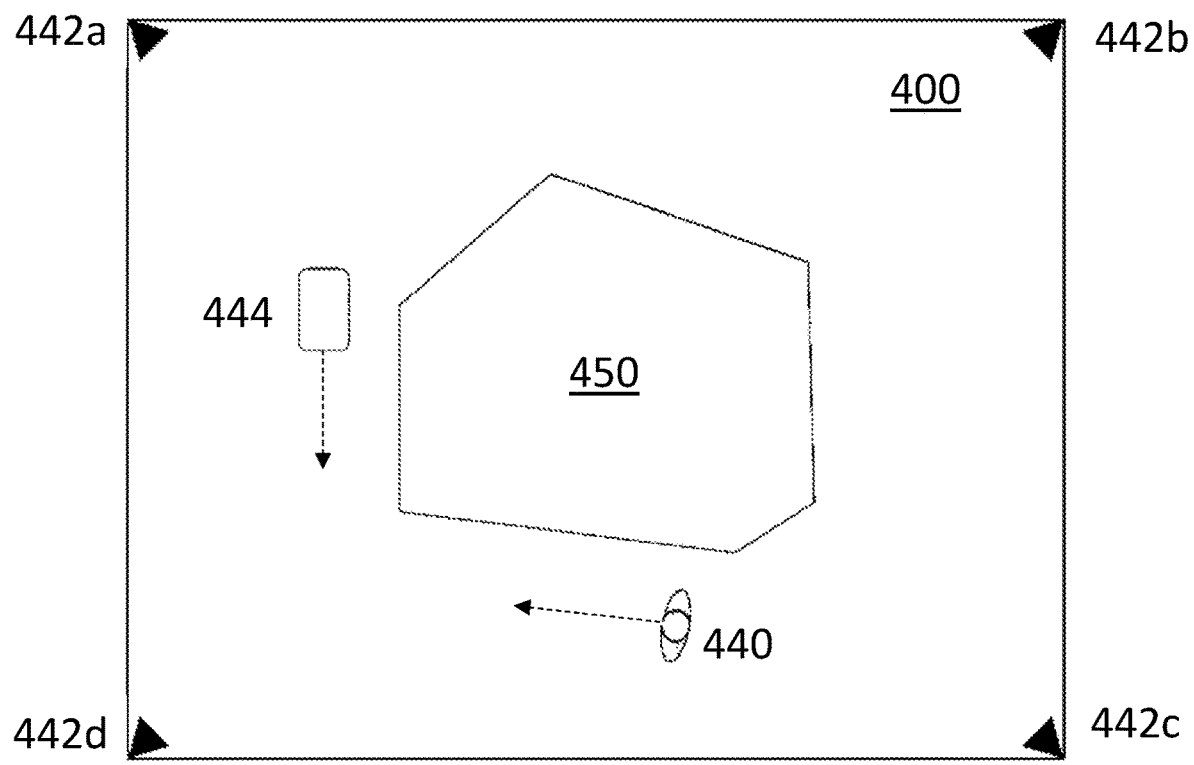
FIG. 4 is a schematic top-plan view of an example environment in which occlusion detection can be performed.

An example environment for this implementation is shown in FIG. 4. A user 440, who is wearing an MR (mixed reality) headset, is walking around in a production facility 400 comprising a real-life occluding feature 450. This facility has been equipped with cameras 442 (442a, 442b, 442c, 442d) in order to keep track of various types of data (e.g. to keep the so-called digital model 112 of the facility 400 up-to-date). These cameras can also be used to enable the X-ray vision of the user 440 via the MR headset. A moving robotic object 444 (an example target object 234) is also moving around the same space 400. The arrows indicate the respective directions of movement of user 440 and object 444.

Figure 5:
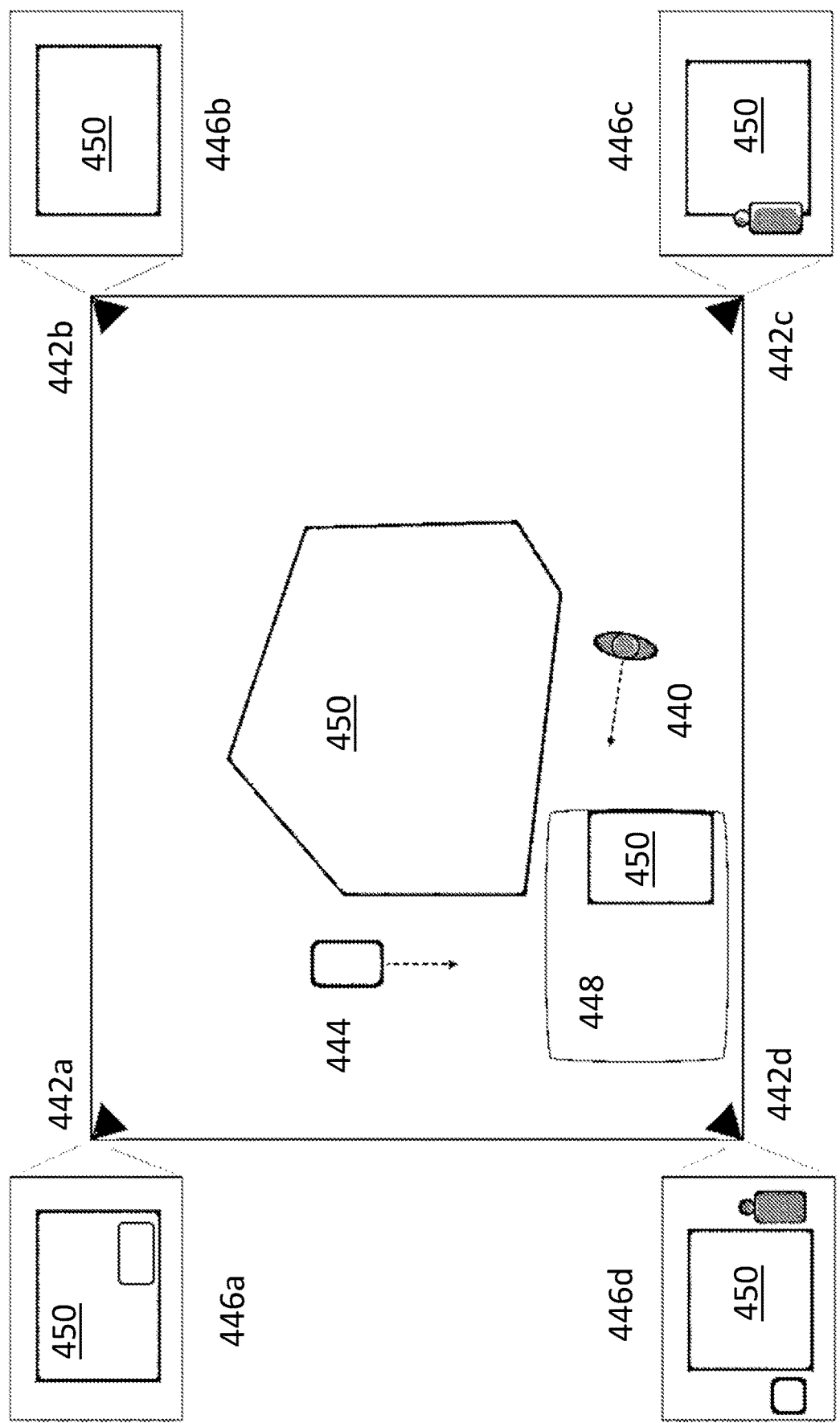
FIG. 5 is a schematic view of the environment of FIG. 4, illustrating the differing views from the different cameras.

FIG. 5 shows a symbolic representation of what is seen by each of the cameras 442 (respective views 446), and by the MR user 440 (view 448). Two of the cameras (442a, 442d) can see the moving robotic object 444 (see views 446a, 446d) and two of the cameras (442c, 442d) can see the MR user 440 (see views 446c, 446d). Camera 442b sees only feature 450 (see view 446b). Note that the MR user cannot see the moving robotic object 444 (see view 448, which also shows only feature 450). View 448 is the view in which it is desirable to show object 444 using the X-ray vision system of this example implementation.

Figure 6:
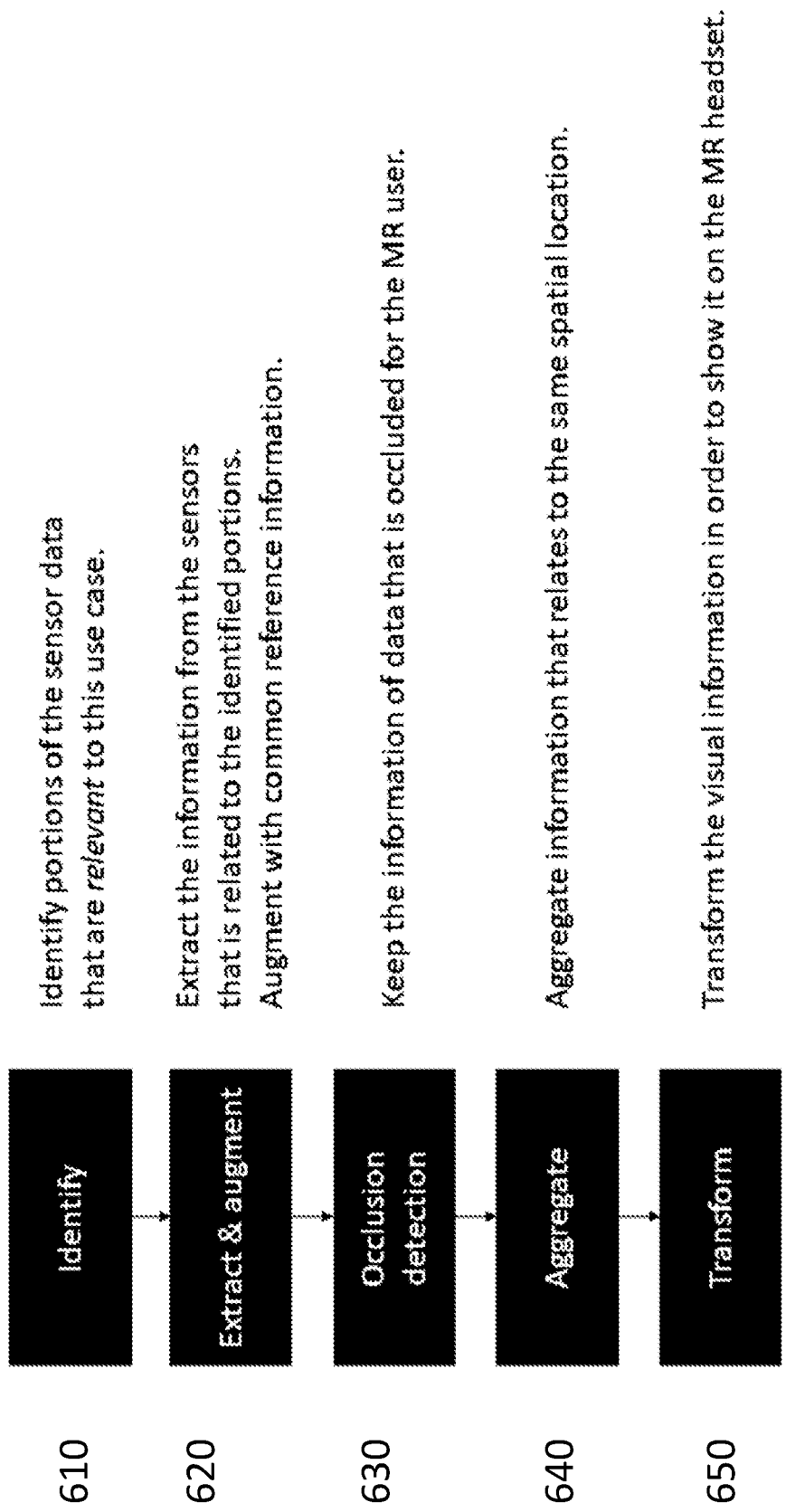
FIG. 6 is an example flow chart for providing "X-ray vision" in the environment of FIG. 4.
Figure 7:
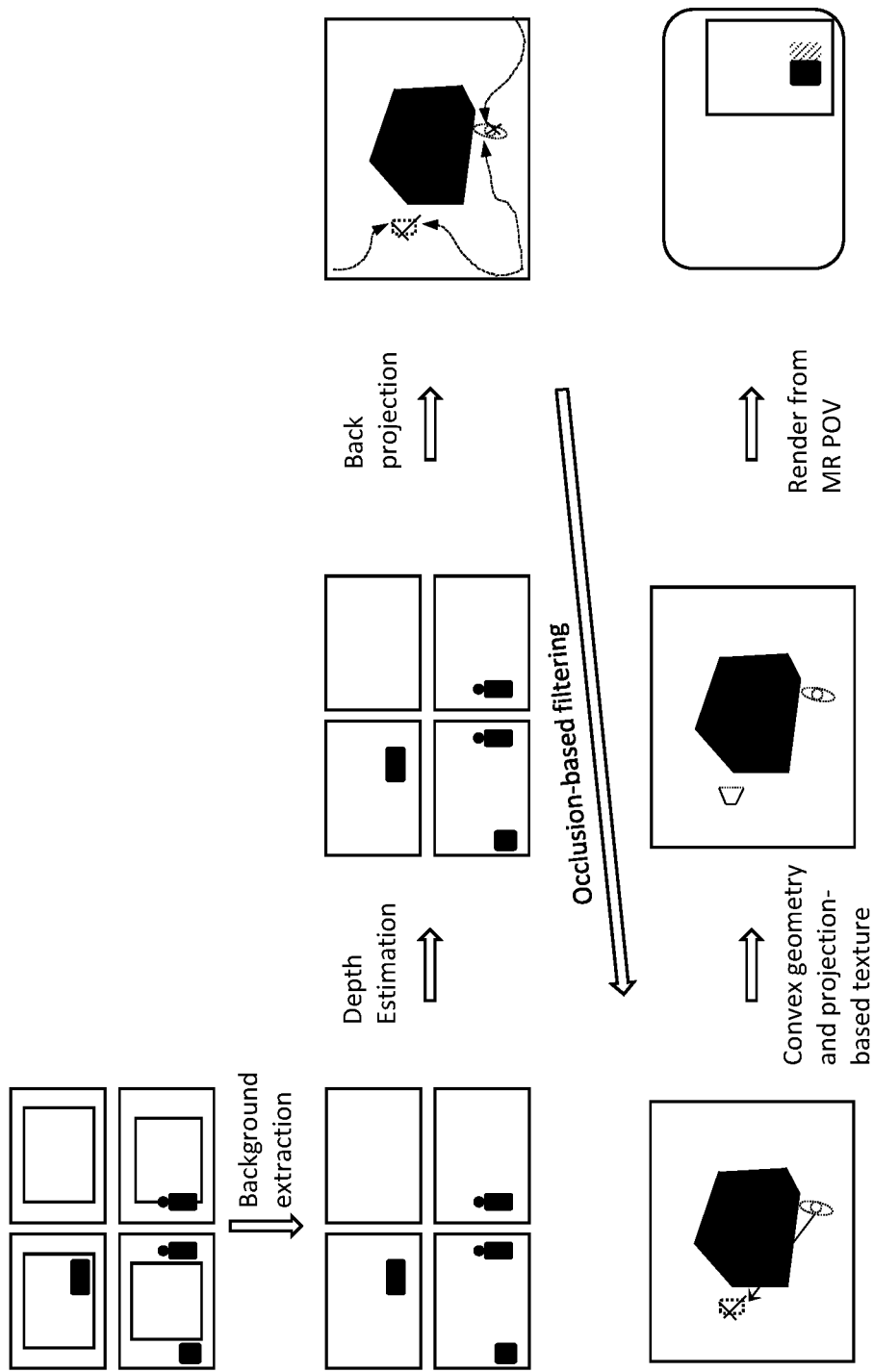
FIG. 7 is a schematic flow diagram for providing "X-ray vision" according to the example outlined in FIG. 6.

FIG. 6 shows the sequence of steps that is performed by the system or apparatus of this example. These steps are described in more detail here. Step 630 corresponds to the operations described above with respect to apparatus 100, and the operations outlined below in FIG. 10. FIG. 7 shows an example implementation of the processing pipeline of FIG. 6. The implementation of FIG. 6 and FIG. 7 assumes an environment with multiple two-dimensional cameras that span the real-world space, and assumes that a digital model 112 (or digital twin) with representations of the static objects in the real-world space (such as object 450 in environment 400) is available.

Step 610: Identify—identification of relevant portions of the sensor data. How relevancy is understood is implementation dependent; for a safety use case this can be any object that is moving and not seen by the end-user; for a productivity use case this can be any object that should be seen by the user to complete a certain task, but which the user cannot see it in reality. In some examples, step 610 comprises a background extraction process from the different two-dimensional (2D) camera feeds (for example, feeds from cameras 442). Background extraction is a well-researched domain, with recent advances being made in the use of AI for background extraction, and the skilled person would understand how to perform said process. The output of the background extraction process is typically a binary map that—for example—has a value 0 for pixels of the background and 1 for pixels in the foreground. Whilst background extraction is used here as a means to identify and extract information from the sensors (cameras 442), in other implementations object detection could be used together with object segmentation in order to provide finer grained control of the objects that are being processed.

Step 620: Extract & augment—extract the visual information that is relevant for the identified portions (and augment with information) for projection into a common reference space. In some examples, augmenting comprises depth estimation. As with background extraction, depth estimation from 2D has also seen big advances through the use of AI. It is now possible to estimate depth from only 2D images under many different conditions. An alternative is that 2D+depth cameras are used to directly measure (or determine) depth rather than estimating it.

Step 630: Occlusion detection—detect occlusions based on the method and apparatus described herein. Occlusion detection comprises projecting the inputs for occlusion detection (i.e. the information extracted at step 620, which can be examples of first and second data 102, 104) into a common reference space. This common virtual reference space is common/shared among the different sensors, the MR user 440 and the digital model 112 or digital twin of the space. This digital twin contains, among other things, the static objects 450 that are present in the environment 400. In this particular example, the depth information can be used along with the camera calibration data to back-project the visual information from the sensors/cameras and the viewpoint of the user 440 into the 3D space of the digital model 112 (assuming that the extrinsic portion of the camera calibration information has calibration information in the common reference space, e.g. the one of the digital model). Alternatively, an additional step may be performed that transforms the back-projected data to this common reference space (using other calibration data as an input). Projecting the inputs brings all the information into a common reference space (which can be the reference space of the digital model, i.e. of the three-dimensional environment) for subsequent analysis, where one can determine whether the MR user (who is located in this space by means of his MR headset) sees certain objects 444 or whether these are occluded by feature 450. In this way, the objects 444 (or portions of objects) that are not seen by the user but should be seen for the given use case, are determined using the occlusion status 116 and/or occlusion vector 120 described above.

In some examples, the visual information that is seen by the MR user, or is assumed to be part of the MR user, can be filtered out from the common reference space. For example, as shown in FIG. 7, top-right box, the cameras also back-project the data of the MR user (i.e. the user 440 is placed into the common reference space using the camera data, even though the position of the user 440 is already known and received as part of the first data 102). The curved arrows in the top right box of FIG. 7 point to the back-projection results for each of the considered cameras. These back-projection results are shown as solid lines on top of the object and person (which are represented by dotted lines). Note that, in this example, we assume there is only a single depth value for the respective objects that were detected in each of the cameras. As such, there is not detailed geometry to back-project but only a back-projected surface (which, when seen from above, is represented here by a line). These surfaces are then used to create a convex bounding shape representation that can be used to render the objects.

Back-projection results can be filtered in order to remove unwanted objects, such as the user, which typically happens in the common reference space. For example, the unwanted user information can be filtered out by adding a bounding box around the user in the common reference space and filtering out all information within that bounding box (see the bottom left image of FIG. 7, where the back-projected surfaces have been removed from above the user). This filtering can reduce the computational resources required for processing.

Step 640: Aggregate—if more than one source of information is available, this different information can be aggregated for processing together in the next step. Aggregated information will be treated as a single object. In some examples, a simple object-agnostic method can be used, which makes use of spatial intersections to determine whether a visual portion is part of the same object. When two information portions intersect, they are assumed to be of the same object and geometry estimation is done by using a convex bounding shape. In the top right image of FIG. 7, two lines can be seen crossing on top of each object. As discussed above, these lines indicate the back-projected data. The image at the middle-bottom of FIG. 7 illustrates how the convex bounding shape could look like when these back-projected 'lines' are assumed (in 3D, these are surfaces and the convex bounding shape is volumetric). The visual information is projected onto this geometric estimation in order to achieve a visual 3D object that can be used to render. If no intersection was present, one could simply project the information onto a plane and use this planar geometry as a proxy for rendering.

Step 650: Transform—modify the information for each of the aggregation groups in order for it to be displayed on the MR headset. This can involve the estimation of object geometry to provide a better render from the point-of-view of the headset user 440. The transformed information can then be rendered on the headset. The information is rendered from the point-of-view of the MR user 440. All information for this is available: the position of the MR user in the common reference space, and the estimate of the (portion of the) target objects 444 that are occluded but should instead be presented to the user. This render is then shown on the MR headset and can be accompanied by a visual effect that makes it clear to the end-user that this is visual information from an X-ray vision, rather than a real object.

In some examples, the visual representation of the objects of interest can be created by means of a convex-hull geometry proxy. This is one example of aggregating visual portions and creating a visual representation from a different point-of-view. Instead of aggregating data that has spatial conflict, one can also simply select the portion that best matches the viewpoint. For example, instead of creating a new convex shape using both the back-projected lines as an input, one could select a single line which best matches the viewpoint (e.g. select the back-projected surface for which the viewpoint is most similar to the respective camera from which the back-projection is done). In that case, the geometry proxy could be a simple plane. When accurate depth information is available (e.g. when provided by 2D+Z cameras), a more detailed geometry proxy can be constructed that uses this depth, which result in a better quality X-ray vision being provided to the user 440.

Implementation 2: Augmented Objects in Relative Motion with Respect to a User/Viewer Another example implementation of the occlusion detection and occlusion status 116 described herein is to augment a real-world object with virtual information that tracks the aforementioned object. As seen from the point-of-view of the (moving) viewer/user (or observer), both real and virtual objects are expected to move as one, such that the virtual information remains associated with the real-world object.

Such augmentation is typically done on the client-side. The observer uses an MR (mixed reality) device (e.g. a mobile phone or a mixed reality headset) that is equipped with cameras. The camera feed is analyzed and object detection and object recognition algorithms are used to identify the area in the camera feed that contains the relevant object that needs to be augmented. Some of these devices have depth sensing which can be used to determine the spatial location of the object in the real-world space. Other devices need to rely on other techniques to estimate this spatial location (e.g. structure from motion, priors, etc.). Once a spatial location of the object is determined, one can generate the augmentation and render it from the point-of-view of the observer. However, this approach relies on object detection and recognition techniques—techniques that are known to sometimes fail for objects which are not part of the training set or have unpredictable appearances (such as when they are partially occluded). Such augmentation can therefore be unreliable.

One example implementation uses explicit detection of occlusions by means of a digital model or digital twin (as is described herein) in order to estimate whether a target object is in-view of a user or not. As such, false positives or false negatives from the detection/recognition algorithms can be identified. The overall robustness of augmentation systems can thus be improved. This implementation relies on a continuous output of the occlusion detector. As such, one needs to add a virtual volume around the object point in cases where no volume data is available for the target object 444.

Figure 8:
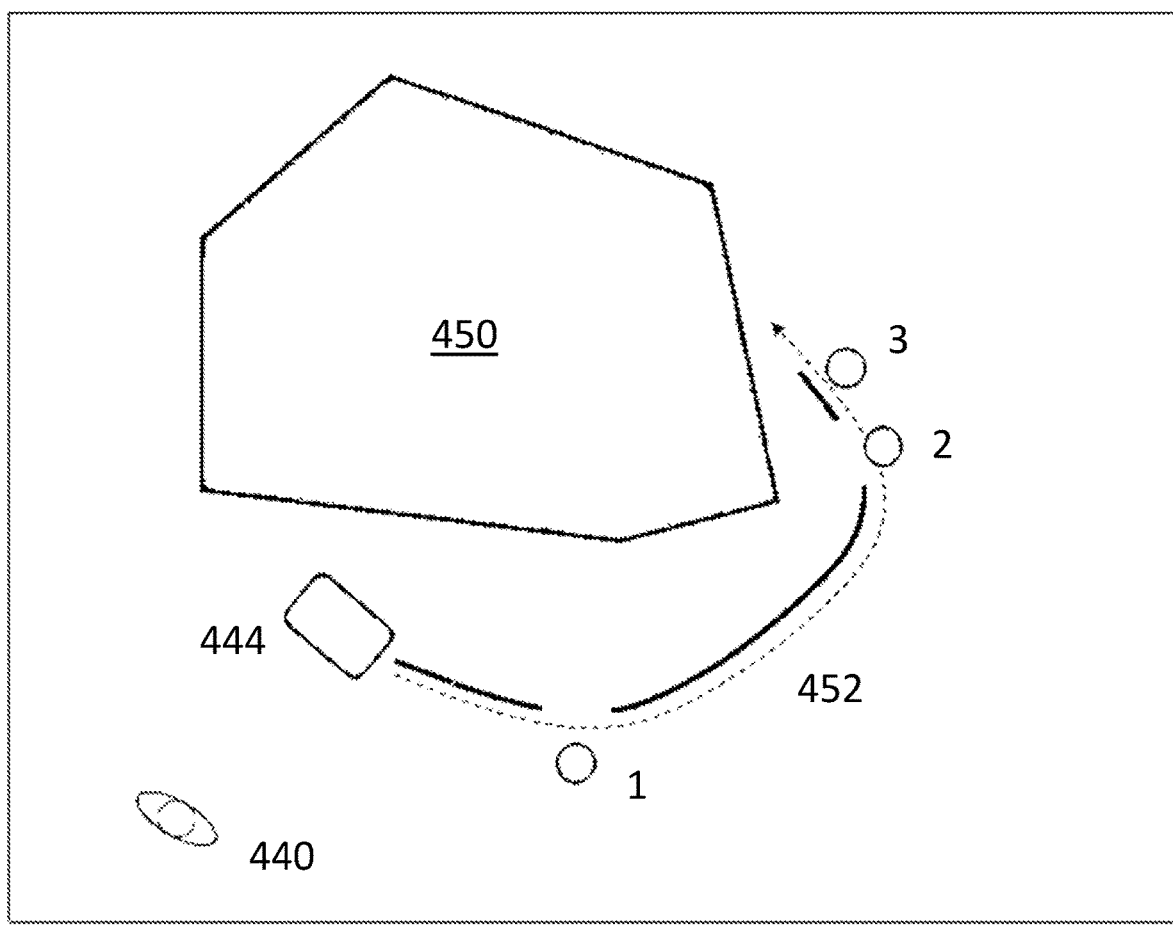
FIG. 8 is a schematic top-plan view of another example environment in which occlusion detection can be performed.

FIG. 8 shows an example of a detection trace of a moving object 444 as created by an object detector/recogniser. The path 452 that the object 444 follows is indicated with a dotted arrow, and the detector results are shown by the line proximate the dotted arrow (the solid black line indicates the object was detected, where breaks along the solid line indicate the object was not detected). Three points along the trace (see the numbered circles) indicate different types of events:

1. False negative: the object should have been detected, but was not (see the break in the line proximate circle 1).
2. True negative: the object was hidden due to occlusion and has indeed switched from being detected to being not detected (see the break in the line proximate circle 2).
3. False positive: the object was detected while it is occluded (see the black line proximate circle 3).

Using the occlusion detection process described herein, one can filter out the false negatives and false positives from the trace and create a more reliable detection result. One can do this by applying the occlusion detection output (i.e. the occlusion status 116) to the result of the object detector, once per frame. By using the last known occlusion status in this manner, the chance of a true positive or true negative event can be estimated and combined with the actual object detection results to provide a more robust and more reliable system.

This implementation relies on a continuous output of the occlusion detector (i.e. a ratio in range [0,1]). As mentioned above, this is typically done by associating a volume to the target object and sampling a plurality of points within the volume. This volume can be extracted from the object detector (if available), or can be arbitrarily configured as a volumetric primitive (e.g. a sphere around the detected point object), depending on the particular application.

The combination of the object detector and the occlusion detector can be done using the following formulae:

$$F(t) = (1 - \alpha)Obj(t) + \alpha F(t-1)$$

$$\text{with } \alpha = \beta + \frac{(1-\beta)\text{ abs }(0.5 - Occl(t))}{0.5}$$

-continued $$F'(t) = \begin{cases} 0 \text{ if } fF(t) \le 0.5 \\ 1 \text{ if } fF(t) > 0.5 \end{cases}$$

where Obj(t) is the output of the object detector at time t, Occl(t) is the last known output of the occlusion detector at time t; F(t) is the filtered result, which is an exponentially smoothed version of the object detector, whereas F'(t) is the binary result (0: no object detected, 1: object detected). The output of the occlusion detector can be used to adapt the filter strength and improve the performance of the object detector. In particular, as seen from the above formulae, the smoothing factor is dependent on the result of the occlusion detector.

When the occlusion detector returns 0.5 (i.e. the ratio of occluded rays to total rays is 0.5), half of the object is hidden and half is not. This uncertainty makes the occlusion status 116 an unreliable value for detecting the object, and thus results in an α that is equal to a pre-defined factor β. This β would define the default smoothing in absence of an extra occlusion detector. When the result from the occlusion detector approaches 0 (fully occluded) and 1 (fully visible), the value of α becomes larger and the filtered result F(t) is more stable (i.e. responds less quickly to changes in the object detector).

Figure 9:
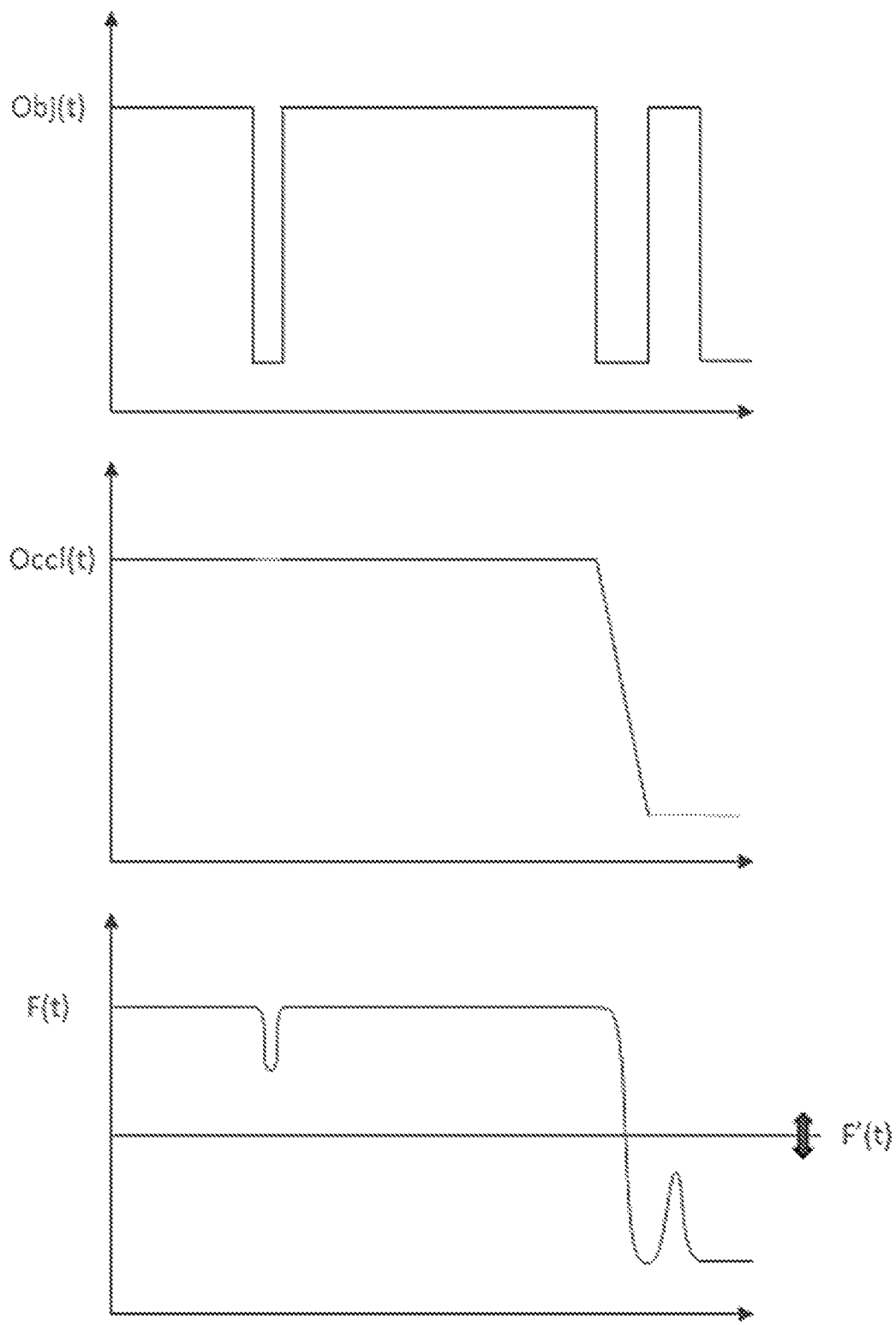
FIG. 9 illustrates how object and occlusion detections can be combined in accordance with the implementation of FIG. 8.

This can be illustrated further with reference to FIG. 9, by moving along the trace 452 of the object 444 in FIG. 8. This displacement along the dotted arrow is represented by the x-axis of FIG. 9, where the y-axis shows the filtered result F(t). The line labelled F'(t) on the bottom graph of FIG. 9 is a threshold level, above which F'(t)=1 and below which F'(t)=0 (above and below the threshold level is indicated by the arrows). At the start of the dotted arrow of FIG. 8, the object detector has successfully detected object 444 and the occlusion detector indicates 1 (which means no occlusion, as discussed above). Moving towards point (1) on the path, the object detector signals that the object is not detected anymore (break in the solid line). The last known result from the occlusion detector is still 1 and the filtered version F(t) doesn't respond quickly to the change of value in Obj(t) (small dip shown in FIG. 9). At path point (2), the object is not fully in sight anymore and the object detector output is 0. At that point, Occl(t) moves from fully visible to fully occluded (1→0) during the occlusion of the object and the filtered version responds quickly to the change in Obj(t) as a result of this change in the occlusion status 116. At path point (3), the false positive from Obj(t) is smoothed out due to the near 0 value of output Occl(t).

Example Method

Figure 10:
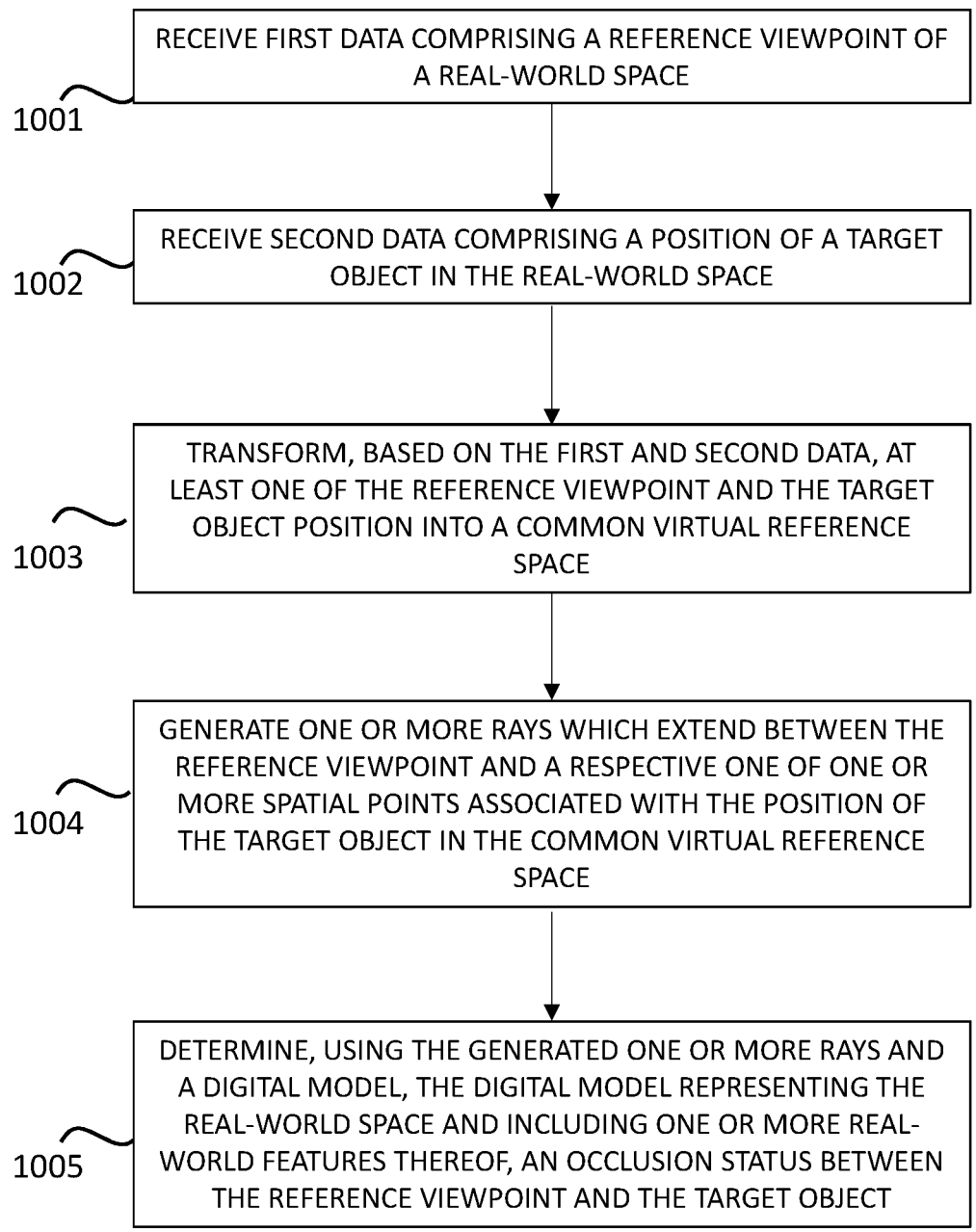
FIG. 10 is a flow diagram showing processing operations according to some examples.

FIG. 10 is a flow diagram showing processing operations according to some example embodiments which may occlusion detection. For example, the processing operations may be performed by hardware, software, firmware or a combination thereof. The processing operations may, for example, be performed by apparatus 100. Apparatus 100 can optionally be part of a processing system of an augmented reality (AR) or mixed reality (MR) device processing system and/or associated with such a device.

A first operation 1001 may comprise receiving first data comprising a reference viewpoint of a real-world space.

A second operation 1002 may comprise receiving second data comprising a position of a target object in the real-world space.

A third operation 1003 may comprise transforming, based on the first and second data, at least one of the reference viewpoint and the target object position into a common virtual reference space.

A fourth operation 1004 may comprise generating one or more rays which extend between the reference viewpoint and a respective one of one or more spatial points associated with the position of the target object in the common virtual reference space.

A fifth operation 1005 may comprise determining, using the generated one or more rays and a digital model, the digital model representing the real-world space and including one or more real-world features thereof, an occlusion status between the reference viewpoint and the target object. The occlusion status can be based on an intersection of the one or more real-world features and the one or more generated rays.

An optional operation may comprise generating an occlusion vector by transforming each of the one or more generated rays into a reference space of the user reference viewpoint, the occlusion vector comprising, for each of the one or more generated rays and the respective spatial point associated with the position of the target object, a transformation of the respective spatial point into the reference space of the user reference viewpoint and an indication of whether the ray is occluded.

Example Apparatus

Figure 11:
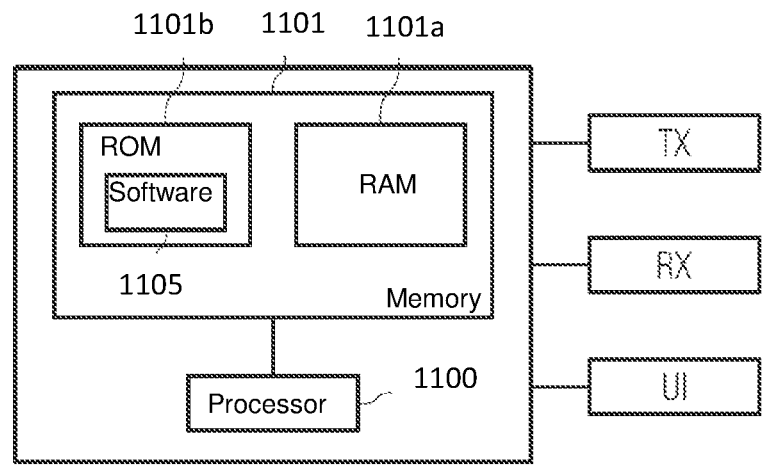
FIG. 11 is a schematic view of an apparatus which may be configured according to one or more example implementations of the process described herein.

FIG. 11 shows an apparatus according to some example embodiments, which may comprise the apparatus 100. The apparatus may be configured to perform the operations described herein, for example operations described with reference to any disclosed process. The apparatus comprises at least one processor 1100 and at least one memory 1101 directly or closely connected to the processor. The memory 1101 includes at least one random access memory (RAM) 1101a and at least one read-only memory (ROM) 1101b. Computer program code (software) 1105 is stored in the ROM 1101b. The apparatus may be connected to a transmitter (TX) and a receiver (RX). The apparatus may, optionally, be connected with a user interface (UI) for instructing the apparatus and/or for outputting data. The at least one processor 1100, with the at least one memory 1101 and the computer program code 1105 are arranged to cause the apparatus to at least perform at least the method according to any preceding process, for example as disclosed in relation to the flow diagrams of FIG. 10 and related features thereof.

Figure 12:
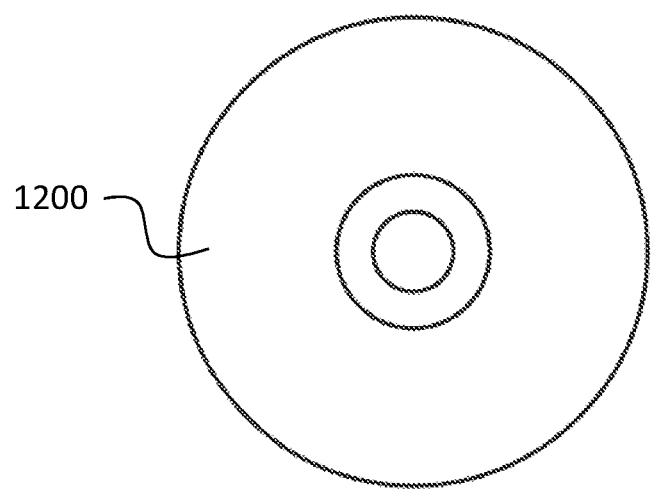
FIG. 12 is a plan view of non-transitory media.

FIG. 12 shows a non-transitory media 1200 according to some embodiments. The non-transitory media 1200 is a computer readable storage medium. It may be e.g. a CD, a DVD, a USB stick, a blue ray disk, etc. The non-transitory media 1200 stores computer program code, causing an apparatus to perform the method of any preceding process for example as disclosed in relation to the flow diagrams and related features thereof.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
   at least one processor; and
   at least one memory storing instructions which, when executed by the at least one processor, cause the apparatus to:
   receive first data comprising a reference viewpoint of a real-world space;
   receive second data comprising a position of a target object in the real-world space, wherein the second data further comprises a three-dimensional volume associated with the target object;
   transform, based on the first and second data, at least one of the reference viewpoint and the target object position into a common virtual reference space;
   spatially sample a plurality of points of the three-dimensional volume to determine one or more spatial points associated with the position of the target object;
   generate one or more rays which extend between the reference viewpoint and a respective one of the one or more spatial points associated with the position of the target object in the common virtual reference space, wherein generating one or more rays comprises generating a plurality of rays extending between the reference viewpoint and each of the plurality of sampled points of the volume; and
   determine, using the generated one or more rays and a digital model, the digital model representing the real-world space and including one or more real-world features thereof, an occlusion status between the reference viewpoint and the target object,
   wherein the occlusion status is based on a number of the plurality of rays intersected by the one or more real-world features.

2. The apparatus of claim 1, wherein the common virtual reference space corresponds to, or maps to, the reference space of the digital model.

3. The apparatus of claim 1, wherein the instructions, when executed by the at least one processor, further cause the apparatus to transform the reference space of the digital model into the common virtual reference space.

4. The apparatus of claim 1, wherein the one or more real-world features of the digital model comprise static features of the real-world space.

5. The apparatus of claim 1, wherein the instructions, when executed by the at least one processor, further cause the apparatus to receive a weight map comprising a plurality of weights, each of the plurality of weights associated with a respective portion of the three-dimensional volume,
   wherein, for each respective portion of the three-dimensional volume, the sampling comprises sampling a respective portion of the plurality of points.

6. The apparatus of claim 5, wherein the sampling comprises sampling the respective portion of the plurality of points using a sampling rate which is reflective of the weight associated with the respective portion of the three-dimensional volume.

7. The apparatus of claim 5, wherein the instructions, when executed by the at least one processor, further cause the apparatus to generate a two-dimensional projection of the weight map based on a two-dimensional projection of the three-dimensional volume from the reference viewpoint,
   wherein the sampling comprises sampling the respective portion of the plurality of points using a sampling rate determined based on the two-dimensional projection of the weight map.

8. The apparatus of claim 5, wherein the second data is received from one or more sensors, wherein one or more of the plurality of weights of the weight map are indicative of a margin of error of the one or more sensors.

9. The apparatus of claim 1, wherein:
   the sampling comprises spatially sampling the plurality of points of the three-dimensional volume at a uniform sampling rate; or
   the sampling comprises spatially sampling the plurality of points of the three-dimensional volume at a sampling rate determined based on a two-dimensional projection of the three-dimensional volume from the reference viewpoint; or
   the sampling comprises randomly sampling the plurality of points, optionally configured to randomly sample the plurality of points using a Monte Carlo method.

10. The apparatus of claim 1, wherein the instructions, when executed by the at least one processor, further cause the apparatus to generate an occlusion vector by transforming each of the one or more generated rays into a reference space of the reference viewpoint,
    the occlusion vector comprising, for each of the one or more generated rays and the respective spatial point associated with the position of the target object, a transformation of the respective spatial point into the reference space of the reference viewpoint and an indication of whether the ray is occluded.

11. The apparatus of claim 10, wherein the instructions, when executed by the at least one processor, further cause the apparatus to output the occlusion vector.

12. A method comprising:
    receiving first data comprising a reference viewpoint of a real-world space;
    receiving second data comprising a position of a target object in the real-world space, wherein the second data further comprises a three-dimensional volume associated with the target object;
    transforming, based on the first and second data, at least one of the reference viewpoint and the target object position into a common virtual reference space;
    spatially sampling a plurality of points of the three-dimensional volume to determine one or more spatial points associated with the position of the target object;
    generating one or more rays which extend between the reference viewpoint and a respective one of the one or more spatial points associated with the position of the target object in the common virtual reference space,
    wherein generating one or more rays comprises generating a plurality of rays extending between the reference viewpoint and each of the plurality of sampled points of the volume; and determining, using the generated one or more rays and a digital model, the digital model representing the real-world space and including one or more real-world features thereof, an occlusion status between the reference viewpoint and the target object, wherein the occlusion status is based on a number of the plurality of rays intersected by the one or more real-world features.

13. The method of claim 12, further comprising generating an occlusion vector by transforming each of the one or more generated rays into a reference space of the reference viewpoint, the occlusion vector comprising, for each of the one or more generated rays and the respective spatial point associated with the position of the target object, a transformation of the respective spatial point into the reference space of the reference viewpoint and an indication of whether the ray is occluded.

14. The method of claim 12, wherein the common virtual reference space corresponds to, or maps to, the reference space of the digital model.

15. The method of claim 12, further comprising transforming the reference space of the digital model into the common virtual reference space.

16. The method of claim 12, wherein the one or more real-world features of the digital model comprise static features of the real-world space.

17. The method of claim 12, further comprising receiving a weight map comprising a plurality of weights, each of the plurality of weights associated with a respective portion of the three-dimensional volume, wherein, for each respective portion of the three-dimensional volume, the sampling comprises sampling a respective portion of the plurality of points.

18. A non-transitory computer readable medium comprising program instructions that, when executed by an apparatus, cause the apparatus to perform at least the following:

receiving first data comprising a reference viewpoint of a real-world space;

receiving second data comprising a position of a target object in the real-world space, wherein the second data further comprises a three-dimensional volume associated with the target object;

transforming, based on the first and second data, at least one of the reference viewpoint and the target object position into a common virtual reference space;

spatially sampling a plurality of points of the three-dimensional volume to determine one or more spatial points associated with the position of the target object;

generating one or more rays which extend between the reference viewpoint and a respective one of the one or more spatial points associated with the position of the target object in the common virtual reference space, wherein generating one or more rays comprises generating a plurality of rays extending between the reference viewpoint and each of the plurality of sampled points of the volume; and determining, using the generated one or more rays and a digital model, the digital model representing the real-world space and including one or more real-world features thereof, an occlusion status between the reference viewpoint and the target object, wherein the occlusion status is based on a number of the plurality of rays intersected by the one or more real-world features.

* * * * *